(12) United States Patent
Kuang et al.

(10) Patent No.: US 10,720,643 B2
(45) Date of Patent: Jul. 21, 2020

(54) POSITIVE ELECTRODE MATERIAL FOR LITHIUM ION BATTERY, METHOD FOR PREPARING THE SAME AND LITHIUM ION BATTERY

(71) Applicant: Contemporary Amperex Technology Co., Limited, Ningde, Fujian (CN)

(72) Inventors: Xinliang Kuang, Fujian (CN); Yujun Chen, Fujian (CN); Long Wang, Fujian (CN); Na Liu, Fujian (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 17 days.

(21) Appl. No.: 15/877,403

(22) Filed: Jan. 23, 2018

(65) Prior Publication Data
US 2018/0212242 A1    Jul. 26, 2018

(30) Foreign Application Priority Data
Jan. 23, 2017 (CN) .......................... 2017 1 0050354

(51) Int. Cl.
| | |
|---|---|
| *H01M 4/525* | (2010.01) |
| *H01M 4/131* | (2010.01) |
| *H01M 10/0525* | (2010.01) |
| H01M 4/02 | (2006.01) |

(52) U.S. Cl.
CPC .......... *H01M 4/525* (2013.01); *H01M 4/131* (2013.01); *H01M 10/0525* (2013.01); *H01M 2004/028* (2013.01)

(58) Field of Classification Search
CPC .... H01M 4/131; H01M 4/1391; H01M 4/525; H01M 4/62; H01M 2004/027; H01M 2004/028; H01M 10/052; H01M 10/0525
See application file for complete search history.

(56) References Cited

FOREIGN PATENT DOCUMENTS

| CN | 1416189 A | * | 5/2003 | ............ H01M 4/485 |
|---|---|---|---|---|
| CN | 103078105 A | * | 5/2013 | |

OTHER PUBLICATIONS

Cho, Woosuk, et al. "Improved Electrochemical and Thermal Properties of Nickel Rich LiNi 0.6 Co 0.2 Mn 0.2 O 2 Cathode Materials by SiO 2 Coating." Journal of Power Sources, vol. 282, Dec. 26, 2014, pp. 45-50., doi:10.1016/j.jpowsour.2014.12.128. (Year: 2014).*
Espacenet Machine Translation of CN 1416189A (Year: 2003).*
Google Patent Machine Translation of CN 103078105A (Year: 2013).*

* cited by examiner

*Primary Examiner* — Brittany L Raymond

(57) ABSTRACT

The present invention provides a positive electrode material for a lithium ion battery including a nickel-containing positive electrode material and a coating layer coated on the nickel-containing positive electrode material, wherein the nickel-containing positive electrode material has a chemical formula of $LiNi_xM_{1-x}O_2$, $0.5 \leq x \leq 1$, M is at least one of Co, Mn and Al, and the coating layer contains lithium vanadium phosphate and silica. Compared with the prior art, the coating layer containing lithium vanadium phosphate and silica coated on the nickel-containing positive electrode material of the present invention can remarkably improve the dynamic performances and the cycle performances at high voltage of the lithium ion battery. In addition, the present invention also provides a method for preparing the positive electrode material a lithium ion battery containing the positive electrode material.

6 Claims, 2 Drawing Sheets

US 10,720,643 B2

POSITIVE ELECTRODE MATERIAL FOR LITHIUM ION BATTERY, METHOD FOR PREPARING THE SAME AND LITHIUM ION BATTERY

CROSS-REFERENCE TO RELATED APPLICATION

The present patent application claims priority to Chinese patent application number 201710050354.0 filed on Jan. 23, 2017, the whole disclosure of which is incorporated herein by reference.

BACKGROUND OF THE INVENTION

Field of the Invention

The present invention generally relates to new energy materials, and more particularly, relates to a positive electrode material for a lithium ion battery and a method for preparing the same and a lithium ion battery.

Description of the Related Art

High-nickel positive electrode material is one of the current development trends of positive electrode materials for a lithium ion battery due to its high capacity and desirable cycle performance. However, poor cycle performance hinders the promotion and application of high-nickel positive electrode materials. For example, the cycle performance under 4.3V of NCM622 material cannot meet actual use requirements. Therefore, improving the cycle performance of high nickel positive electrode material is a key factor of its industrialization application.

At present, oxides are usually coated on surfaces of high-nickel positive electrode materials to improve the cycle performance thereof. For instance, alumina is a most widely used coating material. However, at high voltage and high temperature, the cycle performance of the positive electrode material having alumina coating cannot be remarkably improved. Studies show that silica coating can inhibit the production of HF in the electrolyte at high voltage and high temperature, thereby preventing the electrolyte byproducts from destroying the surface of the positive electrode material, so as to improve the cycle performance of the positive electrode material.

For example, related art discloses that silica can be coated on the surface of a lithium-rich manganese-based material by hydrolyzing tetraethyl orthosilicate to improve its stability. However, tetraethyl orthosilicate is toxic and the process cost is high and, therefore, is not suitable for industrial applications. The related art also discloses reaction of dilute sulfuric acid with sodium silicate to produce silica on the surface of the material, so as to improve the cycle stability thereof. However, the method is unfriendly to the environment and the acid will corrode the material, which leads to a significant decrease in its capacity and poor practicability.

In view of the foregoing, what is needed therefore is to provide a positive electrode material for a lithium ion battery which has desirable cycle performance and dynamic performance, a method for preparing the same and a lithium ion battery.

SUMMARY OF THE INVENTION

One object of the present invention is to provide a positive electrode material for a lithium ion battery which has desirable cycle performance and dynamic performance, a method for preparing the same and a lithium ion battery.

According to one embodiment of the present invention, a positive electrode material for a lithium ion battery includes a nickel-containing positive electrode material and a coating layer coated on the nickel-containing positive electrode material, wherein the nickel-containing positive electrode material chemical has a formula of $LiNi_xM_{1-x}O_2$, $0.5 \leq x \leq 1$, M is at least one of Co, Mn and Al, and the coating layer contains lithium vanadium phosphate and silica.

The reason why the present invention selects lithium vanadium phosphate and silica as the coating layer lies in that: the lithium vanadium phosphate has a stable structure and can improve the dynamic performance and capacity of the lithium ion battery. The silica has a desirable thermal stability and can suppress corrosion of the positive electrode material by HF, thereby improving the cycle performance of the lithium ion battery.

According to one aspect of the present invention, the silica has a particle diameter of 15 nm to 60 nm.

According to one aspect of the present invention, the coating layer containing lithium vanadium phosphate and silica has a thickness of 60 nm to 200 nm. The thickness of the coating layer is determined by the amount of the coated material. If the thickness of the coating layer is too big, the electrical properties of the lithium ion battery will be deteriorated. If the thickness of the coating layer is too small, it is hard to improve the dynamic performance and capacity of the lithium ion battery, and the coating process is difficult to be carried out.

According to one aspect of the present invention, a weight ratio of the lithium vanadium phosphate to the nickel-containing positive electrode material is 0.2% to 1%. When the weight ratio of the lithium vanadium phosphate to the nickel-containing positive electrode material is 0.2% to 1%, the dynamic performance of the lithium ion battery can be improved effectively and the cycle performance of the lithium ion battery will not be deteriorated.

According to one aspect of the present invention, a weight ratio of the silica to the nickel-containing positive electrode material is 0.05% to 0.2%. When the weight ratio of silica to the nickel-containing positive electrode material is 0.05% to 0.2%, the cycle performance of the lithium ion battery can be improved effectively, and the reduction of gram capacity of the positive material due to excessive addition of silica can be avoided.

According to one embodiment of the present invention, a method for preparing a positive electrode material for a lithium ion battery includes the steps of:

(1) mixing the lithium vanadium phosphate, silica and nickel-containing positive electrode materials to obtain a mixture, grinding the mixture and obtaining an intermediate product, wherein the nickel-containing positive electrode material has a chemical formula of $LiNi_xM_{1-x}O_2$, $0.5 \leq x \leq 1$, and M is at least one of Co, Mn and Al;

(2) drying and sintering the intermediate product obtained in step (1); and (3) cooling, crushing and sieving the intermediate product obtained in step (2) to obtain a positive electrode material for a lithium ion battery.

In the method of the present invention, the lithium vanadium phosphate in step (1) may be directly used as a raw material to mix with silica and nickel-containing positive electrode material, or may be indirectly generated by reaction of reactants during the wet coating process. Preferably, the reactants of lithium vanadium phosphate may be lithium carbonate, vanadium pentoxide, ammonium dihydrogen phosphate and oxalic acid (or hydrochloric acid). The weight content of each reactant can be calculated according to the mass percentage of lithium vanadium phosphate in the nickel-containing positive electrode material.

According to one aspect of the present invention, in step (1), in the mixing and grinding process, at least one of ethanol, propanol, ethylene glycol is used as a medium. Preferably, ethanol is used as the medium and the mixing and grinding process is carried out in a ball mill.

According to one aspect of the present invention, in step (2), the intermediate product is dried at a temperature of 60° C. to 150° C. for 4 h to 8 h.

According to one aspect of the present invention, in step (2), the intermediate product is sintered under a nitrogen or argon atmosphere at a sintering temperature of 500° C. to 550° C. for 6 h to 8 h.

According to one aspect of the present invention, in step (3), the sieving process is carried out on a 200 mesh sieve.

According to one embodiment of the present invention, a lithium ion battery includes a positive electrode plate, a negative electrode plate, a separator interposed between the positive electrode plate and the negative electrode plate, and electrolyte, wherein the positive electrode plate includes a positive electrode current collector and a positive electrode material on the positive electrode current collector, the negative electrode plate includes a negative electrode current collector and a negative electrode material on the negative electrode current collector, wherein the positive electrode material includes the positive electrode material for a lithium ion battery according to the present invention or a positive electrode material prepared according to the method of the present invention.

Compared with the prior art, the positive electrode material for a lithium ion battery, the method for preparing the same as well as the lithium ion battery of the present invention at least have the following advantages:

1) The present invention adopts the mixture of lithium vanadium phosphate and silica as the surface coating layer of nickel-containing positive electrode material. The silica can significantly optimize the cycle performance of the positive electrode material. The lithium vanadium phosphate can inhibit the increase of the resistance of the positive electrode material and the decrease of the dynamic performance of the positive electrode material caused by the silica coating. The dynamic performance and the cycle stability at high voltage of the positive electrode material of the lithium ion battery are significantly improved.

2) The method for preparing the positive electrode material for a lithium ion battery of the present invention has the advantages of simple process route, easy parameter control, short process, low cost and no pollution to the environment. The method of the present invention is suitable for large-scale production and has a good application prospect;

3) The lithium ion battery of the present invention adopts the positive electrode material which uses a mixture of lithium vanadium phosphate and silica to coat the nickel-containing positive electrode material. The cycle performance under high voltage is remarkably improved and the dynamic performance is improved significantly.

BRIEF DESCRIPTION OF THE DRAWINGS

Other advantages and novel features will be drawn from the following detailed description of preferred embodiments with the attached drawings. The accompanying drawings, which are incorporated in and constitute a part of this specification, illustrate embodiments of the present invention and, together with a general description of the invention given above, and the detailed description of the embodiments given below, serve to explain the principles of the invention, in which.

DETAILED DESCRIPTION OF PREFERRED EMBODIMENTS

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements.

Example 1

Coating lithium vanadium phosphate and silica on the surface of the positive electrode material $LiNi_{0.65}Co_{0.15}Mn_{0.2}O_2$ includes the following steps:

(1) mixing the lithium vanadium phosphate, silica and $LiNi_{0.65}Co_{0.15}Mn_{0.2}$, adding ethanol as the medium, and carrying out wet-process ball milling on a ball mill for 1 h to obtain an intermediate product, wherein the mass ratio of lithium vanadium phosphate to the $LiNi_{0.65}Co_{0.15}Mn_{0.2}$ is 0.2% and the mass ratio of silica (having an average particle size of 15 nm) to the $LiNi_{0.65}Co_{0.15}Mn_{0.2}$ is 0.08%;

(2) drying the intermediate product obtained in step (1) at 80° C. for 4 h under the protection of nitrogen atmosphere, and sintering the dried intermediate product at 500° C. for 6 h at a heating rate of 5° C./min; and (3) cooling the intermediate product obtained in step (2) in the furnace, crushing the intermediate product and passing the intermediate product through a 200 mesh sieve to obtain a positive electrode material for a lithium ion battery having a coating layer of lithium vanadium phosphate and silica. The SEM photograph of the positive electrode material for a lithium ion battery of Example 1 is shown in FIG. 2.

Figure 2:
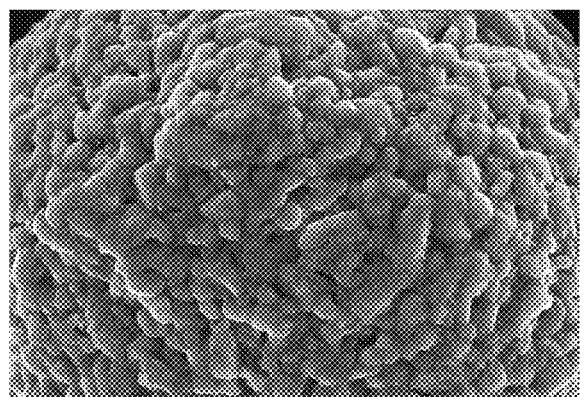
FIG. 2 depicts a SEM photograph (x10000) of a positive electrode material for a lithium ion battery obtained in Example 1 of the present invention.

As can be seen from FIG. 2, there is a thin coating layer on the surface of the positive electrode material for a lithium ion battery, and the coating layer is evenly distributed on the surface of the positive electrode material.

Example 2

The mixture of lithium vanadium phosphate and silica is coated on the surface of the positive electrode material $LiNi_{0.8}Co_{0.15}Al_{0.05}O_2$. The lithium vanadium phosphate is indirectly formed from lithium carbonate, vanadium pentoxide, ammonium dihydrogen phosphate and oxalic acid.

The amount of each reactant is calculated according to the mass ratio of lithium vanadium phosphate to the positive electrode material. The method for preparing the positive electrode material is similar to Example 1, and the specific parameters are shown in Table 1.

Example 3

The mixture of lithium vanadium phosphate and silica is coated on the surface of the positive electrode material $LiNi_{0.8}Co_{0.2}O_2$. The lithium vanadium phosphate is indirectly formed from lithium carbonate, vanadium pentoxide, ammonium dihydrogen phosphate and hydrochloric acid. The amount of each reactant is calculated according to the mass ratio of lithium vanadium phosphate to the positive electrode material. The method for preparing the positive electrode material is similar to Example 1, and the specific parameters are shown in Table 1.

Example 4

The mixture of lithium vanadium phosphate and silica is coated on the surface of the positive electrode material $LiNi_{0.8}Co_{0.1}Mn_{0.1}O_2$. The method for preparing the positive electrode material is similar to Example 1, and the specific parameters are shown in Table 1.

The negative electrode slurry is coated on a thin copper (Cu) film, and the copper film with the negative electrode slurry thereon is dried and cold pressed to obtain a negative electrode plate.

PE porous polymer film is used as the separator. The positive electrode plate, the separator, and the negative electrode plate were stacked in order to obtain an electrode group, in which the positive electrode plate and the negative electrode plate are placed on opposite sides of the separator. The electrode group is wound to obtain a bare cell. The bare cell is placed in an outer package. A prepared base electrolyte is injected into the outer package. The outer package is encapsulated to obtain a whole battery.

Comparative Example 1

Figure 1:
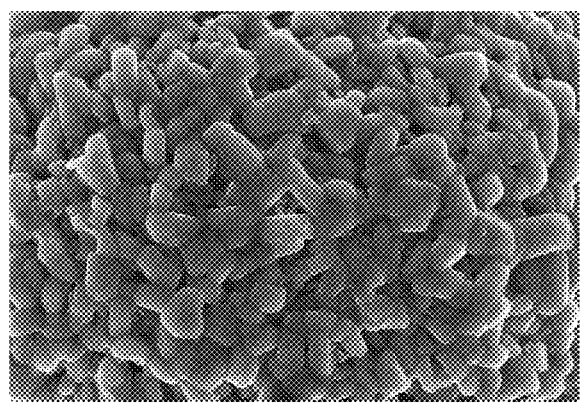
FIG. 1 depicts a SEM photograph (x10000) of a positive electrode material of Comparative Example 1.

Untreated raw positive electrode material having a chemical formula of $LiNi_{0.65}Co_{0.15}Mn_{0.2}$ is used as the positive electrode material. The SEM photograph of Comparative Example 1 is shown in FIG. 1.

Comparative Example 2

The untreated raw material of Comparative Example 1 is used as the positive electrode active material. The acetylene black is used as conductive agent and the polyvinylidene

TABLE 1

Relevant parameters of Examples 1 to 4

| Item | Example 1 | Example 2 | Example 3 | Example 4 |
|---|---|---|---|---|
| positive electrode material | $LiNi_{0.65}Co_{0.15}Mn_{0.2}$ | $LiNi_{0.8}Co_{0.15}Al_{0.05}O_2$ | $LiNi_{0.8}Co_{0.2}O_2$ | $LiNi_{0.8}Co_{0.1}Mn_{0.1}O_2$ |
| thickness of the coating layer | 60 nm | 100 nm | 150 nm | 200 nm |
| mass ratio of lithium vanadium phosphate to the positive electrode material | 0.2% | 0.5% | 0.8% | 1% |
| mass ratio of silica to the positive electrode material | 0.08% | 0.13% | 0.15% | 0.2% |
| particle size of the silica | 15 nm | 30 nm | 45 nm | 60 nm |
| ball milling and wet blending time | 1 h | 2 h | 2.5 h | 2 h |
| drying time | 4 h | 6 h | 8 h | 5 h |
| sintering temperature | 500° C. | 550° C. | 550° C. | 530° C. |
| sintering time | 6 h | 7 h | 8 h | 8 h |

Example 5

The positive electrode material for a lithium ion battery prepared in Example 1 is used as the positive electrode active material. Acetylene black is used as conductive agent and polyvinylidene fluoride (PVDF) is used as binder. The positive electrode active material of Example 1, the acetylene black, the PVDF are added to N-methylpyrrolidone solvent system at a weight ratio of 94:3:3 to obtain a mixture. The mixture is thoroughly stirred until the mixture is homogeneous, to obtain a positive electrode slurry. The positive electrode slurry is coated on a thin aluminum (Al) film, and the aluminum film with positive electrode slurry coated thereon is dried and cold pressed to obtain a positive electrode plate.

The negative electrode material artificial graphite, the hard carbon, the conductive agent acetylene black, the binder styrene-butadiene rubber (SBR) and the thickener carbon methyl cellulose sodium (CMC) are added to deionized water solvent system at a weight ratio of 90:5:2:2:1 to obtain a mixture. The mixture is thoroughly stirred until the mixture is homogeneous to obtain negative electrode slurry.

fluoride (PVDF) is used as binder. The positive electrode active material, the acetylene black and PVDF are added to N-methylpyrrolidone solvent system at a weight ratio of 94:3:3 to obtain a mixture. The mixture is thoroughly stirred until the mixture is homogeneous to obtain positive electrode slurry. The positive electrode slurry is coated on an aluminum (Al) thin film, and the aluminum film with positive electrode slurry coated thereon is dried and cold pressed to obtain a positive electrode plate.

The negative electrode material artificial graphite, hard carbon, a conductive agent of acetylene black, a binder of styrene-butadiene rubber (SBR) and a thickener of carbon methyl cellulose sodium (CMC) are added to deionized water solvent system at a weight ratio of 90:5:2:2:1 to obtain a mixture. The mixture is thoroughly stirred until the mixture is homogeneous to obtain negative electrode slurry. The negative electrode slurry is coated on a copper (Cu) thin film, and the copper film with negative electrode slurry coated thereon is dried and cold pressed to obtain a negative electrode plate.

PE porous polymer film is used as the separator. The positive electrode plate, the separator and the negative electrode plate are stacked in order so that the positive electrode plate and the negative electrode plate are placed on opposite sides of the separator to obtain an electrode group. The electrode group is wound to obtain a bare cell. The bare cell is placed in an outer package. The prepared base electrolyte is injected into the outer package. The outer package is encapsulated to obtain a whole battery.

Comparative Experiment 1: Cycle Stability Comparative Experiment

The whole battery obtained in Example 5 according to the present invention and Comparative Example 2 each is subjected to a cycle stability test under the same condition. The experimental method includes charging the whole battery to 4.3V with a constant current at a rate of 1 C at 25° C. and 45° C. respectively, and discharging the whole battery at a constant current at a rate of 1 C. The results of the experiment are shown in FIG. 3 and FIG. 4.

Figure 3:
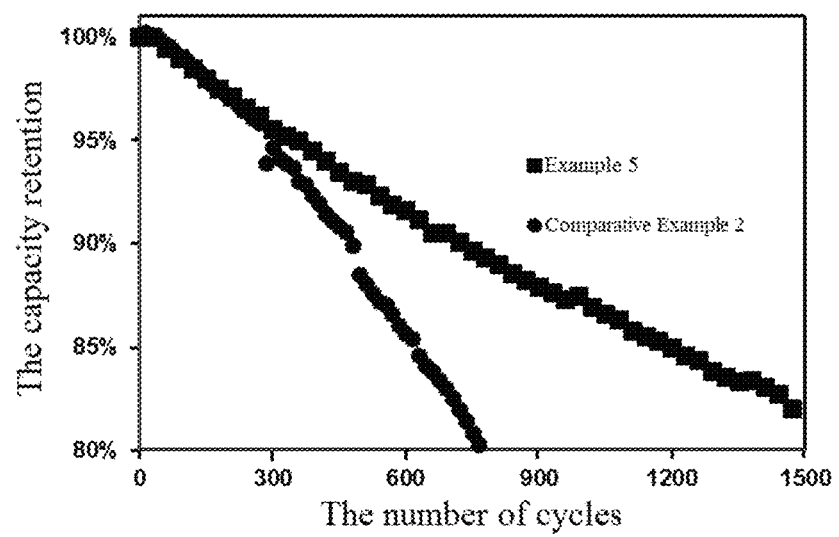
FIG. 3 depicts cycle curves of whole-batteries according to Example 5 of the present invention and Comparative Example 2 at room temperature.
Figure 4:
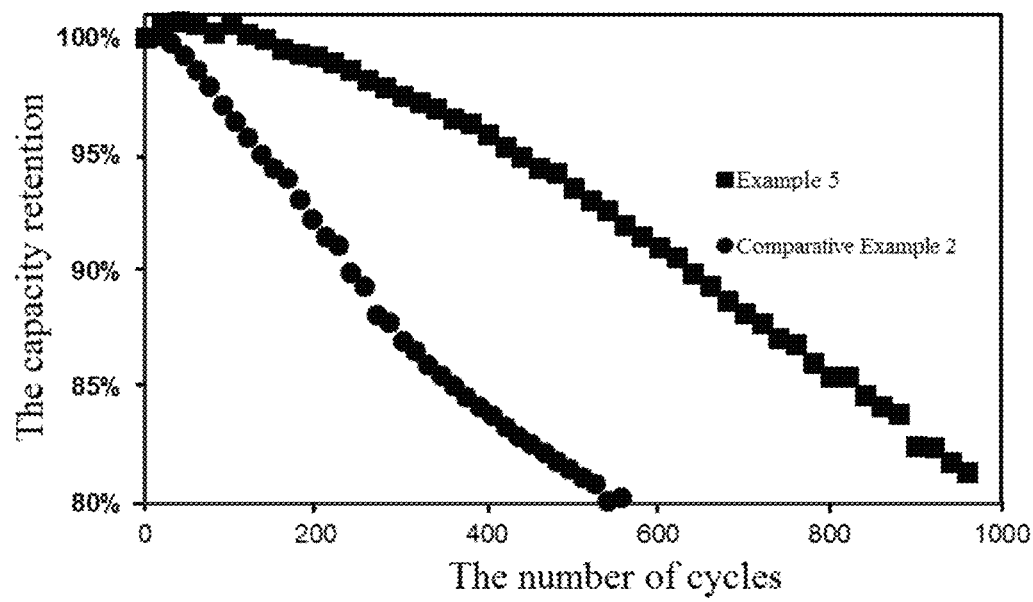
FIG. 4 depicts cycle curves of the whole-batteries according to Example 5 of the present invention and Comparative Example 2 at 45° C.

It can be seen from FIG. 3 and FIG. 4, at 25° C. and 45° C., when the capacity is reduced to 80%, the number of cycles of the whole battery obtained in Example 5 according to the present invention are more than 1500 and about 1000, respectively. The number of cycles of the whole battery of Comparative Example 2 having the untreated raw material at 25° C. and 45° C. is about 750 and 550, respectively. Obviously, the cycle stability (capacity retention) of the whole battery of Example 5 according to the present invention at 25° C. or 45° C. is remarkably improved, which indicates that lithium vanadium phosphate and silica coating can effectively improve the cycle performance of the nickel-containing positive electrode materials at high-voltage. This is because the side effect of the electrolyte under high voltage is more active, and the silica can effectively prevent the surface of the nickel-containing positive electrode material from being damaged by hydrofluoric acid of the by-product of the electrolyte, which can reduce the negative effect of the electrolyte on the nickel-containing positive electrode material and significantly improve the cycle performance.

Comparative Experiment 2: Comparative Experiment of DC Resistance of Cell Discharge The DC resistance test is carried out under the same conditions using the whole battery obtained in Example 5 of the present invention and Comparative Example 2. The experimental method includes testing the DC resistance of the cell at different SOC states (10% to 90%, at an interval of 10%) under the condition of 25° C., respectively. The test method includes adjusting the cell to the specified SOC state, discharging the cell at 4 C for 30 seconds, and adopting the ratio of the voltage difference before and after the discharge to the maximum current value as the DC resistance corresponding to the SOC. The experimental results are shown in FIG. 5.

Figure 5:
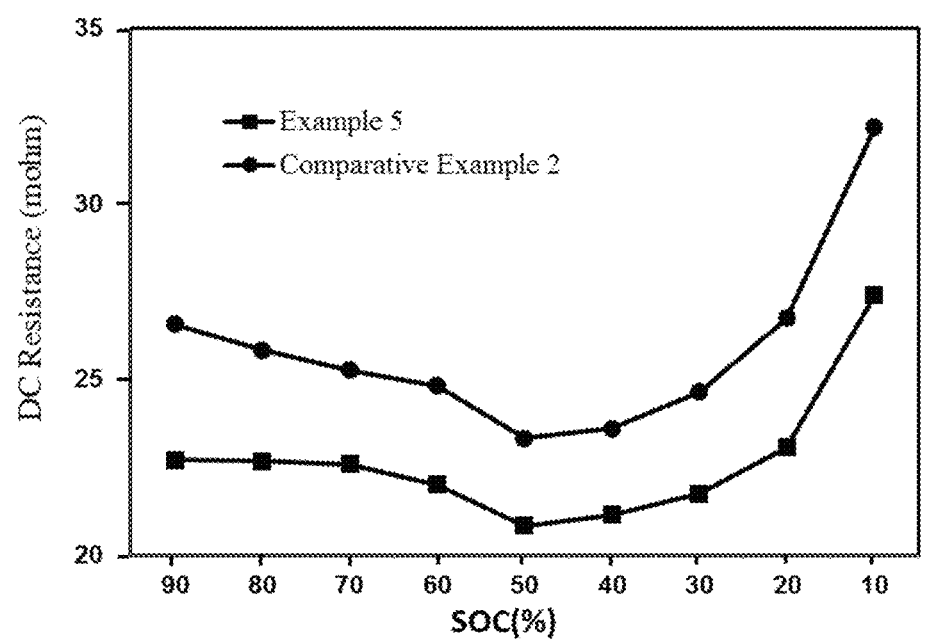
FIG. 5 depicts DC resistance curves of the whole-batteries according to Example 5 of the present invention and Comparative Example 2 in different SOC states.

It can be seen from FIG. 5, the DC resistance of the whole battery obtained in Example 5 of the present invention is remarkably reduced, which indicates that the coating of lithium vanadium phosphate and silica can effectively improve the dynamic performance of the positive electrode material. Since the silica is not conductive, silica coating will reduce the conductivity between the material ions and deteriorate the dynamic performance of the positive electrode material. The lithium vanadium phosphate can provide transmission channel for Li$^+$ to facilitate the conduction of electrons, which can significantly improve the dynamic properties of the positive electrode material.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions describe example embodiments, it should be appreciated that alternative embodiments without departing from the scope of the appended claims. Although specific terms are employed herein, they are used in a generic and descriptive sense only and not for purposes of limitation.

What is claimed is:

1. A positive electrode material for a lithium ion battery, comprising a nickel-containing positive electrode material and a coating layer coated on the nickel-containing positive electrode material, wherein the nickel-containing positive electrode material has a chemical formula of $LiNi_xM_{1-x}O_2$, 0.5≤x≤1, M is at least one of Co, Mn and Al, and the coating layer contains lithium vanadium phosphate and silica, wherein a weight ratio of the lithium vanadium phosphate to the nickel-containing positive electrode material is 0.2% to 1% and a weight ratio of the silica to the nickel-containing positive electrode material is 0.05% to 0.2%.

2. The positive electrode material for a lithium ion battery according to claim 1, wherein the silica has a particle diameter of 15 nm to 60 nm.

3. The positive electrode material for a lithium ion battery according to claim 1, wherein the coating layer containing lithium vanadium phosphate and silica has a thickness of 60 nm to 200 nm.

4. A lithium ion battery, comprising a positive electrode plate, a negative electrode plate, a separator interposed between the positive electrode plate and the negative electrode plate, and electrolyte, the positive electrode plate comprises a positive electrode current collector and a positive electrode material on the positive electrode current collector, the negative electrode plate comprises a negative electrode current collector and a negative electrode material on the negative electrode current collector, wherein the positive electrode material comprise a nickel-containing positive electrode material and a coating layer coated on the nickel-containing positive electrode material, the nickel-containing positive electrode material has a chemical formula of $LiNi_xM_{1-x}O_2$, 0.5≤x≤1, M is at least one of Co, Mn and Al, and the coating layer contains lithium vanadium phosphate and silica, wherein a weight ratio of the lithium vanadium phosphate to the nickel-containing positive electrode material is 0.2% to 1% and a weight ratio of the silica to the nickel-containing positive electrode material is 0.05% to 0.2%.

5. The lithium ion battery according to claim 4, wherein the silica has a particle diameter of 15 nm to 60 nm.

6. The lithium ion battery according to claim 4, wherein the coating layer containing lithium vanadium phosphate and silica has a thickness of 60 nm to 200 nm.

* * * * *